Nov. 1, 1932.  F. J. CHAPMAN  1,885,510
GLARE SCREEN OR VISOR FOR MOTOR VEHICLES
Filed July 7, 1931   2 Sheets-Sheet 1
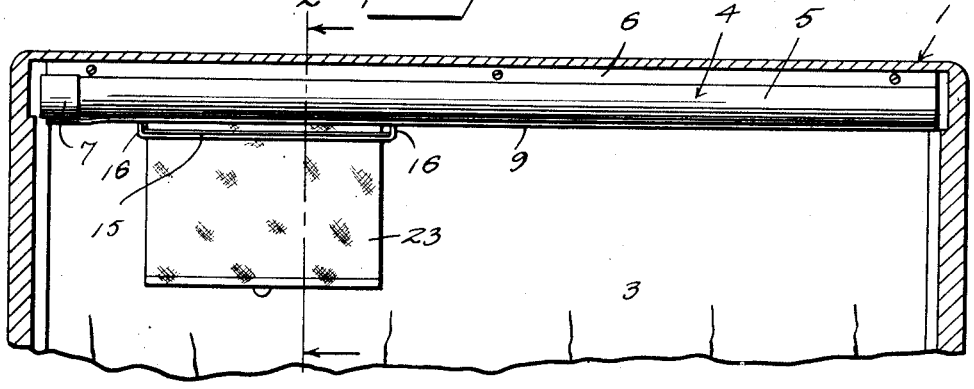
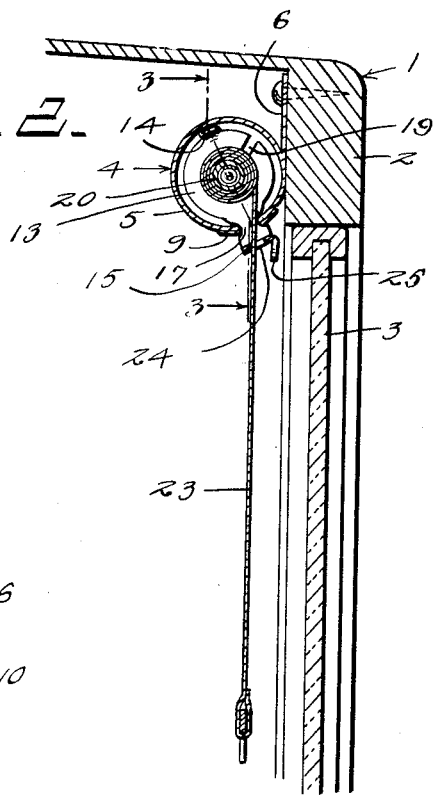
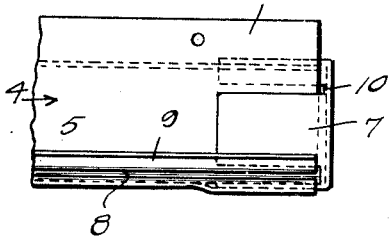
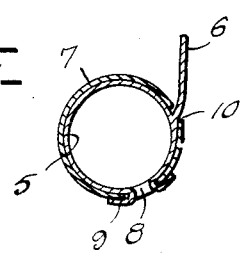
Inventor
F. J. Chapman
By Watson E. Coleman
Attorney Nov. 1, 1932. F. J. CHAPMAN 1,885,510
GLARE SCREEN OR VISOR FOR MOTOR VEHICLES
Filed July 7, 1931   2 Sheets-Sheet 2
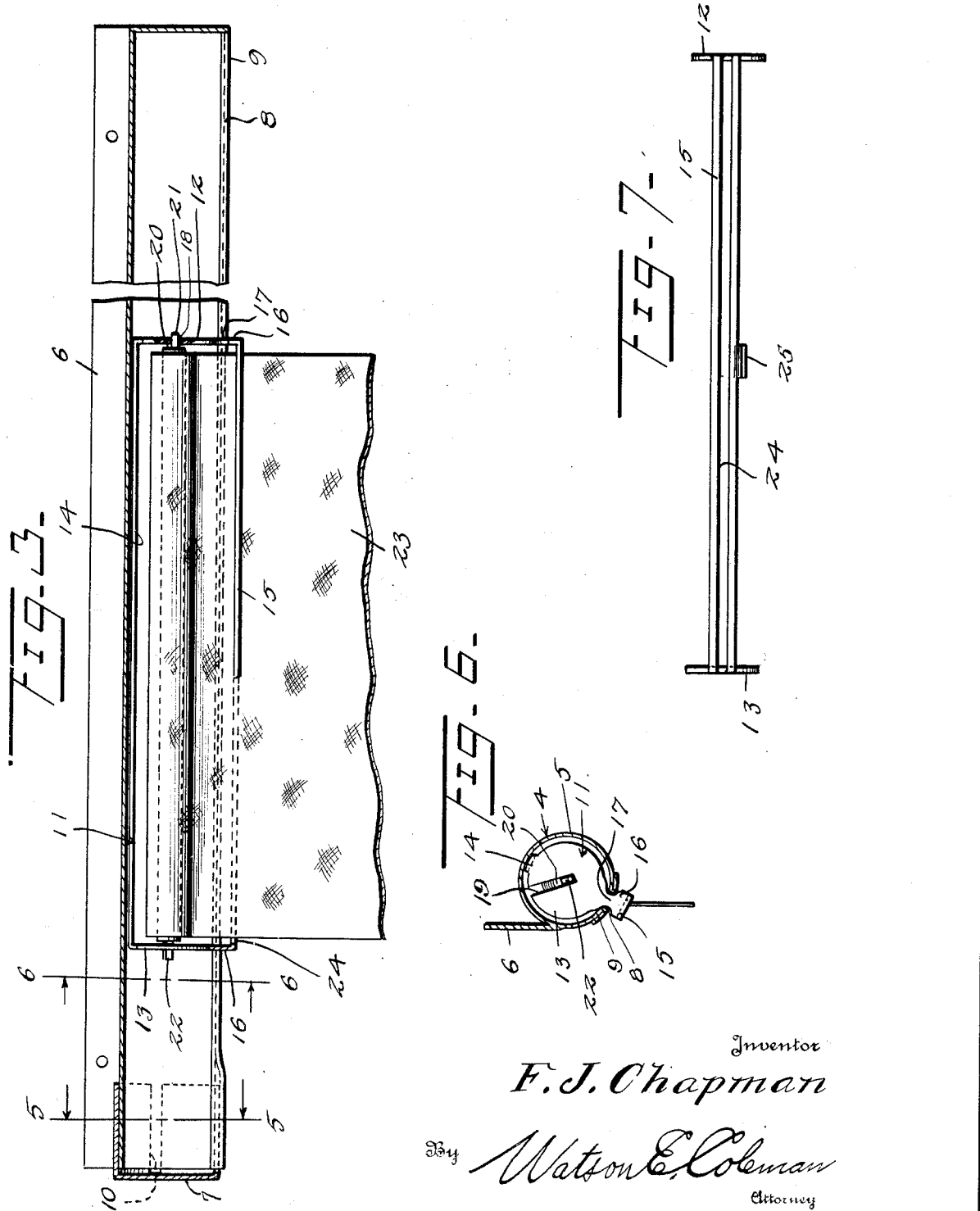

Patented Nov. 1, 1932

1,885,510

UNITED STATES PATENT OFFICE

FRED J. CHAPMAN, OF DOUGLAS, ARIZONA

GLARE SCREEN OR VISOR FOR MOTOR VEHICLES

Application filed July 7, 1931. Serial No. 549,231.

This invention relates to an attachment for a motor vehicle, and pertains particularly to a device by means of which the eyes of the vehicle driver or a passenger in the front seat of the machine may be protected from the glare of the sun or of the headlights of an approaching vehicle.

The primary object of the present invention is to provide a glare shield or visor which may be readily shifted vertically across the vehicle windshield adjacent which it is mounted or shifted horizontally to be located in the most desirable position.

A further object of the invention is to provide a shield of the character described which covers only a small area of the windshield and which may be shifted transversely thereof so that it may be employed for interrupting the rays of the sun or light from the lamps of an approaching vehicle, without obstructing the view of the driver.

A still further object of the invention is to provide a glare screen or visor which may be readily rolled up to an out of the way position, when it is not in use.

Other objects and advantages of the present invention will become apparent as the description of the same proceeds, and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in transverse section of the upper portion of a motor vehicle top showing the device embodying the present invention in position therein.

Figure 2 is a vertical sectional view taken on the line 2—2 of Figure 1.

Figure 3 is a longitudinal sectional view through the device taken on the line 3—3 of Figure 2.

Figure 4 is a view in elevation of one end of the screen cylinder.

Figure 5 is a sectional view taken on the line 5—5 of Figures 3.

Figure 6 is a sectional view taken on the line 6—6 of Figure 3.

Figure 7 is a bottom plan view of the screen supporting frame per se.

Referring more particularly to the drawings, wherein like numerals of reference indicate corresponding parts throughout the several views, the numeral 1 indicates generally the front portion of a motor vehicle top across which there extends the usual transverse portion 2 which lies directly above the windshield 3.

The present device is indicated generally by the numeral 4 and is secured in any suitable manner to the inner side of the transverse portion 2 of the vehicle top. The device 4 consists of a cylinder 5 which is preferably of sufficient length to extend the entire width of the vehicle windshield and, while a number of different ways may be employed for securing this cylinder in position, there is here shown illustrated a flange 6 formed integral with the cylinder, which lies against the inner face of the cross member 2 of the vehicle top and may have securing elements, such as screws or the like, passed therethrough into the body against which it is positioned.

The cylinder 5 is permanently closed at one end and at its other end is closed by a removable cap 7. The wall of the cylinder 5 is provided with a longitudinally extending slot 8 which is so positioned that, when the cylinder is mounted in the manner shown, it opens directly downwardly, as illustrated in Figure 2. Along each edge of the slot 8 there is positioned a strip of material 9 which forms a turned back continuation of the body of the cylinder and, in addition to reinforcing the body, provides a rounded edge for the slot.

The cap 7 has the cylindrical portion thereof provided with a longitudinal slot which receives the adjacent ends of the strips 9, the longitudinal edges of the slot in the wall of the cap passing between the strips and the wall of the cylinder. This cylinder portion of the cap is also provided with an additional slot 10 which receives the adjacent end of the flange 6.

Disposed within the cylinder 5 is a short frame structure, which is indicated as a whole by the numeral 11. This frame comprises two plate members 12 and 13 which are substantially circular and adapted to snugly fit in the cylinder. These plates are connected by a top bar 14 which is housed in the cylinder and a bottom bar 15 which is located outside of and beneath the cylinder, the bottom bar having its ends upturned, as indicated at 16, and joined to the lower edges of the plates 12 and 13 by the narrow connecting members 17 which pass upwardly through the slot 8.

One of the two plate members 12 and 13 has a central aperture 18 therein while the other has a slot 19 opening inwardly from the edge to the center thereof. Between these plates 12 and 13 there is positioned a spring controlled shade roller 20 of the same character as is used for window shades, the trunnion 21 at one end engaging in the aperture 18, while at the other end the flat pin 22, which connects with the spring in the roller, positions in the slot 19.

A shade member 23 of any suitable material is secured to and wound upon the roller 20 and passes downwardly through a slot 24 formed through and longitudinally of the bar 15. It will thus be seen that the reduced extensions 17 on the plates 12 and 13 serve to prevent the turning of the plates in the cylinder and the slotted bar 15, which these extensions support, acts as a guide for the screen or shade 23 to prevent it from coming into contact with the edges of the cylinder slot 8 and also to act as a guide for the shade.

The bar 15 has formed integral therewith a depending extension 25 by means of which it may be conveniently grasped so that the longitudinal shifting of the unit 11 and the shade carried thereby may be readily effected.

As previously stated, the frame structure 11 is relatively short and thus it may be shifted in the cylinder 5 to any desired position between the sides of the windshield 3. By forming this structure in this manner a narrow shade may be employed which may be positioned as desired to just cut off the rays of light which may annoy the vehicle driver, without obscuring a very large portion of his vision.

It will also be readily apparent that two of the units 11 may be mounted in the cylinder 5 so that the driver of the machine may have one and a rider beside him on the front seat may have the benefit of the other.

While the drawings illustrate the cylinder 5 as being mounted within the top of a vehicle in such a manner as to be entirely exposed to view, it will, of course, be readily understood that it may be positioned in the upholstery of the top in such a manner as to be entirely hidden with the exception of the opening 8 through which the glare screen or shade may be drawn or, if desired, the front cross piece 2 may be made in the form of a housing in which the cylinder may be positioned.

Having thus described the invention, what is claimed is:

1. An attachment for a motor vehicle having a windshield, comprising an elongated casing adapted to be mounted transversely of the upper part of the windshield, a shade, a shade roller having said shade mounted thereon, and a frame having said roller mounted therein and shiftably positioned in said casing, said casing having an opening through the wall thereof for the passage of said shade.

2. An attachment for a motor vehicle having a windshield, comprising an elongated cylindrical casing adapted to be secured transversely of the top of the windshield, having a slot in and longitudinally of the wall thereof, a frame disposed in said casing and comprising a pair of plates having a connecting bar therebetween, a shade roller mounted between said plates, and a shade adapted to be wound onto said roller and to be drawn downwardly therefrom through said casing slot.

3. An attachment for motor vehicles having a windshield, comprising an elongated cylindrical casing adapted to be secured transversely of the upper portion of the windshield and having a slot formed through and longitudinally of the wall thereof, a relatively short frame comprising a pair of plate members disposed in vertical position and connected by an upper and lower bar, said plate members and said upper bar being disposed within the casing and said lower bar being disposed exteriorly thereof and connected with said plates by vertically disposed elements extending through the casing slot, said lower bar having a longitudinal slot therein, a spring controlled shade roller mounted between said plates, and a shade secured to and wound on said roller and extending downwardly through said casing slot and through the slot of said lower bar.

4. An attachment for a motor vehicle having a windshield, comprising an elongated casing adapted to be mounted transversely of the upper part of the windshield, a shade, a shade roller having said shade mounted thereon, and a carrier on which said roller is mounted and disposed within the casing for movement longitudinally therein, said casing having an opening through the wall thereof for the passage of said shade.

5. An attachment for a motor vehicle having a windshield, comprising an elongated casing adapted to be mounted transversely of the upper part of the windshield, a shade, a shade roller having said shade mounted thereon, a carrier on which said roller is mounted and disposed within the casing for movement longitudinally therein, said casing having an opening through the wall thereof for the passage of said shade, and a slotted guide supported by the carrier and located outside the casing for the shade and through which the shade is drawn.

In testimony whereof I hereunto affix my signature.

FRED J. CHAPMAN.